(12) United States Patent
Limbert et al.

(10) Patent No.: US 10,676,340 B2
(45) Date of Patent: Jun. 9, 2020

(54) FILLING HOSE

(71) Applicant: DEB IP LIMITED, Derbyshire (GB)

(72) Inventors: Dean Limbert, Derbyshire (GB); Jack Kidd, Derbyshire (GB); Chris Lang, Derbyshire (GB); David Creaghan, Derbyshire (GB); John Hines, Derbyshire (GB)

(73) Assignee: DEB IP LIMITED, Derbyshire (GB)

( * ) Notice: Subject to any disclaimer, the term of this patent is extended or adjusted under 35 U.S.C. 154(b) by 0 days.

(21) Appl. No.: 15/755,492

(22) PCT Filed: Aug. 24, 2016

(86) PCT No.: PCT/GB2016/052621
§ 371 (c)(1),
(2) Date: Feb. 26, 2018

(87) PCT Pub. No.: WO2017/033004
PCT Pub. Date: Mar. 2, 2017

(65) Prior Publication Data
US 2018/0339895 A1    Nov. 29, 2018

(30) Foreign Application Priority Data

Aug. 27, 2015  (GB) .................................. 1515252.3
Dec. 18, 2015  (GB) .................................. 1522348.0

(51) Int. Cl.
*B67D 3/00*      (2006.01)
*A47K 5/12*      (2006.01)
(Continued)

(52) U.S. Cl.
CPC .................. *B67D 3/00* (2013.01); *A47K 5/12* (2013.01); *B05B 9/007* (2013.01);
(Continued)

(58) Field of Classification Search
CPC .. F16L 11/00; F16L 11/12; B67D 7/38; B67D 7/342; B67D 7/02; B67D 7/0288;
(Continued)

(56) References Cited

U.S. PATENT DOCUMENTS 4,149,573 A      4/1979  Cassia
5,311,899 A  *   5/1994  Isayama .................. F16L 37/42
                                                137/240

(Continued)

FOREIGN PATENT DOCUMENTS

JP        S58-64994 A       4/1983
JP        H09-145515 A      6/1997
(Continued)

OTHER PUBLICATIONS

Office Action issued in corresponding Japanese Patent Application No. 2018-503132, dated Aug. 7, 2018.
(Continued)

*Primary Examiner* — Timothy P. Kelly
(74) *Attorney, Agent, or Firm* — Venable LLP; Henry J. Daley

(57) ABSTRACT

A liquid dispenser filling hose for use in filling a liquid dispenser with liquid from a liquid reservoir via a pump, comprising: a distal coupler for coupling the filling hose to the liquid dispenser; and a controller arranged to control the pump. The liquid dispenser may be filled using a method comprising: providing a liquid reservoir, a pump and a controller arranged to control the pump, and a filling hose having a proximal end and a distal end, the proximal end of the filling hose being coupled to the liquid reservoir; coupling the distal end of the filling hose via a distal coupler to the liquid dispenser; and transferring liquid from the liquid reservoir via the filling hose to an airless liquid container forming part of the liquid dispenser.

(Continued)

A system for filling a liquid dispenser, comprising: the liquid filling hose; and a liquid reservoir and/or liquid supply station is also described.

18 Claims, 4 Drawing Sheets

(51) Int. Cl.
| | |
|---|---|
| *F16L 37/44* | (2006.01) |
| *F16L 37/00* | (2006.01) |
| *B05B 9/00* | (2006.01) |
| *B05B 11/00* | (2006.01) |
| B05B 9/04 | (2006.01) |
| B05B 14/00 | (2018.01) |

(52) U.S. Cl.
CPC ........ *B05B 11/0097* (2013.01); *F16L 37/008* (2013.01); *F16L 37/44* (2013.01); *B05B 9/04* (2013.01); *B05B 9/0403* (2013.01); *B05B 14/00* (2018.02)

(58) Field of Classification Search
CPC ............... B67D 7/344; Y10T 137/0379; Y10T 137/0396
See application file for complete search history.

(56) References Cited

U.S. PATENT DOCUMENTS

| | | |
|---|---|---|
| 5,556,005 A | 9/1996 | Banks |
| 5,934,509 A * | 8/1999 | Niss .................... A21C 15/005 |
| | | 222/83 |
| 6,024,251 A | 2/2000 | Werner et al. |
| 6,082,586 A | 7/2000 | Banks |
| 6,341,629 B1 | 1/2002 | Clark et al. |
| 8,708,006 B2 | 4/2014 | Martin |
| 9,758,363 B2 * | 9/2017 | Sayers .................... B67D 7/02 |
| 2003/0019536 A1 | 1/2003 | Smith |
| 2008/0173705 A1 | 7/2008 | Girard et al. |
| 2008/0315581 A1 | 12/2008 | White |
| 2010/0038384 A1 | 2/2010 | Wallace et al. |

FOREIGN PATENT DOCUMENTS

| | | |
|---|---|---|
| JP | 2000-501363 A | 2/2000 |
| WO | 92/19530 A2 | 11/1992 |

OTHER PUBLICATIONS

Office Action issued in corresponding Japanese Patent Application No. 2018-503132, dated Jan. 30, 2019.

International Search Report and Written Opinion in International Patent Application No. PCT/GB2016/052621, dated Jul. 12, 2016.

* cited by examiner

FILLING HOSE

CROSS-REFERENCE TO RELATED APPLICATIONS

This application is a U.S. National Phase of International Patent Application No. PCT/GB2016/052621, filed Aug. 24, 2016, the entire content of which is incorporated by reference, which claims the benefit of Great Britain Patent Application No. 1515252.3, filed Aug. 27, 2015, and Great Britain Patent Application No. 1522348.0, filed Dec. 18, 2015.

FIELD

The present invention relates to a liquid dispenser filling hose for use in filling a liquid dispenser with liquid from a liquid reservoir via a pump, a method for filling a liquid dispenser, and a system for filling a liquid dispenser.

BACKGROUND

Liquid dispensers release a liquid upon user activation. Various configurations of liquid dispensers exist. The liquid can be dispensed in a discrete or continuous fashion. The liquids being dispensed can be soap, shampoo, other hand sanitizer or lotion, cleaning agents, etc. Liquid dispensers can be manual, e.g. operator pushes a lever, or can be automatic, e.g. activated upon motion detection. The applications of liquid dispensers are numerous and include soap dispensing in bathrooms, soap or shampoo dispensing in showers and baths, sanitizing dispensers for use in operating theatres or treatment rooms, sanitization facilities for factories, school dining halls, etc. Liquid dispensers typically employ anti-bacterial soap and are often used for hygienic and infection fighting purposes.

Refillable liquid dispensers can be wall mounted and can be judiciously situated to conveniently serve a number of operators for sanitization in key locations such as prior to entry to the dining hall, in the toilet, at the entry to and within a patient room, or prior to operating in the operating theatre.

Yet the functionality of promoting hygiene of such liquid dispensers can be entirely compromised by soap contamination resulting from the refill process. In the worst case scenario, instead of preventing spread of harmful bacteria, the liquid dispenser can itself become a harbour of dangerous, and even infectious, bacteria and promote the spread of such bacteria. Recent studies have shown that one in four bulk soap dispensers in public lavatories suffer from bacterial contamination. Such contamination can result in the spread of infectious diseases and, particularly in hygiene critical locations such as hospitals, even death.

Despite the highly significant threat associated with contamination during refill, the prior art fails to adequately address this problem.

One means to ameliorate the threat of refill-related contamination is to employ the use of replaceable cartridges that are sealed. The seal of the cartridges is pierced upon installation in the liquid dispenser. Sealed cartridges can be subjected to high-quality contamination control at the point of manufacture and the potential for contamination during transit, prior to installation is reduced. Furthermore, regular replacing of the liquid container from which liquid is dispensed in the dispenser safeguards against bacterial accumulation in the dispenser container. An example of such a seal and piercing arrangement can be found in the soap dispensing system of U.S. Pat. No. 4,149,573. Hygienically sealed cartridges are also available in which the outlet from the cartridge is sealed with a valve, an example of which can be found in U.S. Pat. No. 5,556,005. Wherein the valve is mechanically opened only as the cartridge is fitted into the dispenser. Hygienically sealed cartridges that are sealed with a disposable pump are also known in the art, and example of which can be found in U.S. Pat. No. 6,082,586. In all of these examples the product within the cartridge is protected from contamination by the preclusion of air ingress as the product is evacuated, this is achieved through allowing the cartridge to collapsing as the liquid product is expelled.

U.S. Pat. No. 6,341,629 discloses a liquid dispenser for volatile liquids comprising a pressure sensor.

A significant drawback of such a cartridge-based system is liquid wastage arising from refilling prior to the currently installed cartridge becoming fully depleted. Time to depletion is generally unknown and unpredictable. Refilling at the point of depletion may not be convenient, particularly as the liquid dispenser is then rendered temporarily, and depending on the application potentially unacceptably, unusable pending replacement of the cartridge. Liquid dispensers tend to be refilled during nightly shifts by janitors or other service providers. Thus the temptation is to set the refilling frequency and container volume such that during ordinary or even heavy use the liquid dispensers will never become depleted and rendered temporarily out of action. But replacing a cartridge prior to depletion of that cartridge undesirably results in liquid wastage. This not only leads to increased costs, but unnecessary disposal or wastage is out of keeping with the trend of the times to promote reduced impact to the environment, otherwise known as being environmentally friendly.

U.S. Pat. No. 8,708,006 attempts to address this drawback by providing a check valve assembly that can be fitted to a container and provides a one-way valve through which liquid can be transferred into the container. The check valve assembly has a pointed tip that pierces the wall of a liquid container and the check valve assembly can be subsequently mounted to the container. A liquid reservoir, pump and hose are provided to enable fluid to be pumped through the hose to the container via the check valve assembly. In this way a cartridge refill system can be retro fitted to facilitate partial refill of a non-empty cartridge.

Whilst U.S. Pat. No. 8,708,006 addresses the problem of liquid wastage resulting from refilling prior to depletion by allowing topping up of liquid in containers, it fails to adequately address the problem of contamination arising from the refill process itself, and in this sense may be thought of as providing one step forwards, two steps backwards. Mitigation against contamination is ultimately sacrificed in favour of a more practical means of refill.

In keeping with the remaining pier art, U.S. Pat. No. 8,708,006 fails to adequately address the problem of contamination of the liquid owing to exposure of the liquid to air during the refill process.

Yet prevention of exposure of the liquid to air is a crucial factor in mitigating against contamination arising from the refill process.

Embodiments of the present invention can provide partial refills without sacrificing mitigation against contamination.

There is also a deficiency in the prior art in terms of providing filling hoses that are arranged to control a pump and thus the delivery of fluid to fluid dispensers from the refill process.

U.S. Pat. No. 6,341,629 discloses a liquid dispenser for volatile liquids comprising a pressure sensor.

Embodiments of the present invention can provide a smart plug and play filling hose that can provide control of the pump and hence the refill process.

SUMMARY

The invention is defined by the independent claims below. Dependent claims are directed to optional features and preferred embodiments.

There is disclosed herein a liquid dispenser filling hose for use in fining a liquid dispenser with liquid from a liquid reservoir via a pump, comprising: a distal coupler for coupling the filling hose to the liquid dispenser; and a controller arranged to control the pump.

The provision of a controller in the liquid dispenser filling hose arranged to control a pump renders the filling hose plug and play; the filling hose can be coupled to the fluid dispenser, with the controller controlling the filling of the fluid dispenser via control of the pump. The provision of the controller in the filling hose facilitates for example initiation of the pump upon coupling of the liquid filling hose with the liquid dispenser.

The controller may be detachably connectable to the filling hose. This facilitates replacement of the filling hose.

The controller may be arranged to communicate with the pump via control lines running along the length of the filling hose arranged to form an electrical connection with the pump. Alternatively, the controller may be arranged to wirelessly communicate with the pump. Where a liquid supply station is employed, the controller may be arranged to wirelessly communicate with a wireless receiver, or preferably transceiver, in the liquid supply station. Thus pump or other electrical components in the liquid supply station, such as a diverter, can be controlled. The controller may also be arranged to wirelessly communicate with a wireless receiver, or preferably transceiver, in the liquid dispenser. Thus the controller can communicate with any sensors or other electrical components in the liquid dispenser. Wireless communication prevents the need for a physical electrical connection and in the case of employing a detachable controller, offers a synergy in that the filling hose can be made cheap and easy to replace without being concerned about electrical transmission.

The liquid dispenser filling hose may further comprise a proximal coupler. This enables coupling between the filling hose and the liquid supply and/or a pump, which may be an inline pump. Thus unlike in conventional systems where the filling hose and liquid supply are integral, this form of filling hose is separable from the liquid supply. This facilitates separate manufacture and improved potential for cleaning, as one or other of the filling hose or liquid supply can be separately cleaned or replaced. Control lines, if provided, may be arranged to extend between the controller to an electrical interface at the proximal coupler to electrically connect with a corresponding electrical interface in electrical communication with the pump. The corresponding electrical interface may be provided as part of the liquid reservoir or liquid supply station.

The liquid dispenser filling hose may further comprise a second liquid reservoir, which advantageously allows for the provision of a second liquid. The second liquid reservoir may be configured to contain a concentrate. Such a concentrate may comprise soap. As used herein, the term "soap" is intended to include any liquid detergent or cleaning product suitable for being dispensed from a liquid dispenser. Should such a concentrate comprise soap, the liquid filling hose could be coupled to a liquid reservoir configured to contain only water. The filling hose could then be used to refill a liquid dispenser with soap solution. Advantageously this would allow the liquid reservoir to be refilled when required from a standard water outlet. In addition, providing the soap in concentrated form, means that it can be contained in a smaller volume reservoir, and as such is more easily transported and more conveniently stored. For example, multiple doses of concentrate may be carried around by an operative, meaning that fewer trips to a soap storage area must be undertaken on a liquid dispenser refilling round.

The second liquid reservoir may be removably attached to the filling hose. As the second liquid reservoir is not permanently fixed to the filling hose, this allows for straightforward replacement or inspection of the second liquid reservoir without causing damage to, or requiring replacement of, the filling hose.

Liquid flow through the filling hose from a liquid reservoir to a liquid dispenser may be activated by operation of the controller. Alternatively, liquid flow may be automatically activated by the action of coupling the filling hose to a liquid dispenser. Automatic activation could further reduce the risk of bacterial contamination, by removing the requirement for manually operated activation means.

The second liquid reservoir may be in fluid communication with the filling hose when fluid flow through the filling hose is activated. The second liquid reservoir may be configured to allow the flow of concentrate from the second liquid reservoir to the filling hose when liquid flow through the filling hose is activated, thus providing in-situ dilution. By preventing the flow of concentrate between the second liquid reservoir and the filling hose when liquid flow within the filling hose is not activated, wastage of the concentrate is prevented. In addition, the build-up of residual concentrate within the filling hose is prevented, further reducing the likelihood of contamination within the filling hose.

The second liquid reservoir may be arranged between the distal coupler and the proximal coupler. This allows the second reservoir to be positioned at any point along the filling hose that is convenient for an operative. For example, the second liquid reservoir may be arranged proximate the distal coupler. Should an operative have the filling hose connected to a liquid reservoir, and arranged such that access to a portion of the filling hose proximate the proximal coupler is restricted, the second liquid reservoir may be arranged nearer to the distal coupler to allow convenient access and operation. The second liquid reservoir may also be provided as part of the distal coupler. This means that only water from a liquid reservoir passes along the length of the filling hose, to combine with the concentrate from the second reservoir at a point close to a connected liquid dispenser. This further ensures that any build-up of residual concentrate within the filling hose is prevented, further reducing the likelihood of contamination within the filling hose.

The liquid dispenser filling hose may further be operated with a liquid reservoir. The second liquid reservoir may be removably attached to the liquid reservoir. This provides for a concentrate contained therein to be transferred directly into the liquid reservoir rather than the filling hose. Advantageously, this allows the concentrate to be diluted to a desired concentration prior to the combined liquids entering the filling hose.

The second liquid reservoir may have a body portion. Said body portion may be deformable. This can be advantageous as it allows the concentrate in the second liquid reservoir to be deposited from the second liquid reservoir to the liquid reservoir when the body portion is deformed. The concentrate can therefore be quickly and easily transferred to the liquid reservoir without the requirement for a more complex (e.g. mechanical) ejection mechanism.

The second liquid reservoir may comprise a cartridge. Said cartridge may be configured to be detachable from the filling hose or liquid reservoir. For example, upon the volume of concentrate contained therein reaching a predetermined minimum level, advantageously, such a configuration allows for the second liquid reservoir to be quickly and easily replaced with another. In circumstances whereby the volume of concentrate contained therein has become depleted, this allows for the cartridge to be replaced with another containing a larger volume of concentrate. The cartridge may be quickly and easily replaced with another, as the portable nature of the cartridge allows for an operator to carry multiple cartridges on a liquid dispenser filling round, without the requirement to frequently return to a soap storage area such as a cupboard. Such a configuration is of low-complexity and as such, could reduce operating costs.

The second liquid reservoir may additionally comprise a valve arrangement. Said valve arrangement advantageously prevents the release of concentrate from the second liquid reservoir when said reservoir is not releasably attached to the filling hose. Additionally, the valve arrangement may also control movement of the concentrate from the second liquid reservoir to the filling hose or liquid reservoir. For example, movement of the concentrate may only be permitted when liquid is being transferred along the filling hose between the liquid reservoir and the liquid dispenser.

Further, said valve arrangement may be configured to control the extent of dilution of the concentrate with the liquid within the filling hose. This allows an operator to refill a liquid dispenser with soap solution of a desired concentration. Advantageously, it can be ensured that said concentration is not too high, which could result in wastage of concentrate and increased costs. It can also be ensured that said concentration is not too low, which could result in a soap solution being dispensed from the liquid dispenser that is ineffective in killing pathogens.

The second liquid reservoir may comprise a translucent or transparent material. This facilitates identification of the point at which the volume of concentrate contained therein has depleted to a level at which replacement of the cartridge is warranted. The entire body portion of the cartridge may comprise said transparent or translucent material. Alternatively, the cartridge may comprise a window of the transparent or translucent material.

The second liquid reservoir may be removably attached to the filling hose or liquid reservoir by a rotate-and-click coupling. Such a coupling provides audible feedback to the operator ensuring that a good fit has been achieved, mitigating against contamination arising from an improper coupling.

The pump may be provided as part of a liquid supply station and the liquid reservoir may be mateable with the liquid supply station; and the proximal coupler may be arranged to couple the filling hose with the liquid supply station. Thus the filling hose can effectively control the operation of the liquid supply station upon coupling therewith. The liquid supply station pump may be provided proximal of the liquid reservoir of the liquid supply station.

The pump may be an in-line pump disposed in-between the liquid reservoir and the filling hose. This provides the benefit of facilitating purging when the pump is operated in a reverse mode.

The liquid reservoir of the liquid supply station may be a cartridge. In cartridge form, the liquid reservoir can easily be replaced. Alternatively, the liquid reservoir of the liquid supply station will often be collapsible removing the need for air ingress as the liquid is dispensed. In the case where the liquid reservoir is collapsible, the pump may be provided in the form of a mechanical actuator arranged to compress the liquid reservoir thereby to force liquid out of the liquid reservoir. The liquid reservoir may be refillable using the refilling methods disclosed herein thereby preventing contamination. Alternatively, the reservoir may be single use, as this provides an alternative method of preventing contamination, in many instances the reservoir will be both collapsible and single use. A further advantage of the use of a single use reservoir is a reduction in waste compared to conventional systems. As noted above, it is typical for liquid dispensers to include replaceable cartridges, in such systems, every time the cartridge is empty, it is replaced. In the systems described here, the liquid dispenser is refilled, with the cartridge being replaceable, resulting in a net reduction in waste as only the larger reservoir is discarded.

The controller may be arranged to electrically communicate with the liquid supply station upon coupling between the filling hose and the liquid supply station thereby to control operation of the pump. This provides a simple means of control communication.

The filling hose may provide the pump. This pump may be an in-line pump. In this variant, control communication, which is preferably electrical, between the filling hose and the pump is simplified as it need not go via an interface. Furthermore, the pump can be optimized for the specifics of the filling hose—length, width, frictional resistance to liquid, etc.

The pump may be mechanically actuated. Mechanical actuation facilitates provision of a lower cost solution and mitigates the need for power input to the pump.

The pump may be electronically actuated. Electronic actuation facilitates automatic control over pumping and reduced user burden.

The filling hose may be collapsible. A collapsible filling hose offers significant advantages. Collapsing offers a mode of purging; as air or old liquid is expunged from the filling hose, the filling hose collapses and in the fully collapsed state no such air or old liquid can remain in the filling hose. Purging in this manner is simplified as the filling hose does not resist expunging of air and liquid and the need to retain a vacuum in the filling hose is obviated.

The filling hose may comprise a suction port, preferably proximally disposed, fluidly connected with the filling hose for purging the filling hose of air. Providing a separate aperture for expunging the air facilitates the provision of a simplified junction at the proximal entry end of the filling hose; flow can then be made unidirectional in a distal direction at the proximal entry end, rather than having to be made bidirectional to provide purging capability.

The suction port may be provided with a suction port coupler. This enables coupling between the suction port and an external suction means.

The suction port coupler may be arranged to couple the filling hose with the liquid supply station.

The liquid dispenser filling hose may comprise a liquid supply station coupler arranged to couple both the proximal end of the filling hose and the suction port to the liquid supply station. Thus a convenient means of coupling is offered.

The proximal coupler may be arranged such that upon coupling a proximal valve is formed in the couple. The liquid dispenser filling hose may further comprise a proximal valve. The distal coupling means may be arranged such that upon coupling with the liquid dispenser a distal valve is formed in the couple. The liquid dispenser filling hose may further comprise a distal valve.

The proximal and/or distal valves may be one-way valves arranged to permit fluid flow in a distal direction only. Thus fluid can enter distally through the proximal end of the filling hose and exit distally through the distal end of the filling hose. This prevents contamination arising from reverse flow back into the filling hose and potential contamination of the liquid reservoir.

The proximal and/or distal valves are reversibly operable to block fluid flow in both distal and proximal directions. This facilitates purging by sucking air and/or old liquid from the filling hose whilst preventing new air and/or liquid from entering. It is convenient in this arrangement for valves to be solenoid valves and the controller to be electronic and to electrically communicate with the solenoid valves thereby to control the operation of the solenoid valves. In a particularly preferable arrangement, there is provided a proximal solenoid valve in the liquid reservoir or liquid supply station and a distal solenoid valve in the liquid dispenser, and the liquid filling hose is arranged to electrically communicate upon coupling with the liquid reservoir or liquid supply station and upon coupling with the liquid dispenser thereby to control the solenoid valves.

The liquid dispenser filling hose may further comprise a distal coupling detector that provides a signal to the controller upon coupling between the liquid filling hose and the liquid dispenser, wherein the controller is arranged to communicate with the pump to initiate liquid transfer upon coupling of the filling hose with the liquid dispenser. This prevents the operator from having to manually initiate transfer and facilitates more rapid filling.

The automatic initiation of liquid transfer may be prevented in the case where the filling hose has not been purged. Thus filling of a liquid dispenser prior to purging of the filling hose is prevented, preventing air or old liquid in the filling hose contaminating new liquid from the liquid source. The controller may be configured to provide an audible or visual warning indicating that the filling hose remains to be purged.

The controller may be arranged to provide transfer input means to allow an operator to manually activate transfer of the fluid.

The purging action may comprise operation of the pump to dispel the contents of the filling hose therefrom using liquid from the liquid reservoir.

The purging action may comprise operation of the pump in reverse mode to suck the contents of the filling hose therefrom.

The controller may be arranged to operate the proximal and/or distal valves so as to block fluid flow in both directions during the purging action.

The liquid filling hose may further comprise a purger control interface. Thus the operator may control purging operations.

The filling hose may be provided with a proximal coupling detector arranged to send a signal to the controller upon coupling between the filling hose and the liquid supply and the controller may be arranged to automatically initiate the purging action upon coupling of the filling hose to the fluid reservoir or fluid supply station. This safeguards against failure to purge a newly connected filling hose, thus limiting another means to contamination.

The filling hose controller may be arranged to communicate with a diverter provided in the liquid supply station, the diverter being switchable between one flow path fluidly connecting the liquid reservoir and the filling hose, and another flow path fluidly connecting the filling hose and a waste exit channel. In this arrangement the filling hose can be conveniently coupled to the liquid supply station and liquid dispenser and the controller may be arranged to automatically activate purging prior to initiation of the fluid transfer. Thus the possibility of transferring liquid through the filling hose without having purged the filling hose of air and/or old liquid is removed, safeguarding against contamination and there is a greatly simplified operation. An inline pump may be provided between the diverter and the filling hose that can be operated in a forward and in a reverse direction. The controller may be arranged to electrically communicate with the pump and the diverter The liquid filling hose may comprise a fill-level module in communication with the controller and arranged to send a fill-level signal to the controller. The fill-level module may be arranged to communicate with the liquid dispenser and receive and forward to the controller a fill-level signal generated by the liquid dispenser. Alternatively the fill-level module may itself comprise a fill-level detector. The fill-level detector may comprise a pressure sensor arranged to detect a change in pressure in the fluid that is being transferred to the liquid dispenser.

The controller is arranged to prevent liquid transfer when the fill-level signal is indicative of the fluid dispenser being full. Thus over-filling the liquid dispenser is prevented.

The controller may be arranged to provide a lockout feature. The lockout feature may be arranged to lockout the filling hose after one use. Alternatively the lockout feature may be arranged to lockout the filling hose after a predefined number of uses. The lockout feature may be arranged to prevent transfer of liquid to the dispenser upon exceeding a pre-defined number of uses of the filling hose and/or the liquid reservoir and/or liquid supply station.

There is also disclosed a method of filling a liquid dispenser, comprising: providing a liquid reservoir and a filling hose, optionally purged, the filling hose having a proximal end and a distal end, the proximal end of the filling hose being coupled to the liquid reservoir; coupling the distal end of the filling hose to the liquid dispenser; and transferring liquid from the liquid reservoir via the filling hose to an airless liquid container forming part of the liquid dispenser.

Transferring the liquid from the liquid reservoir via the filling hose to the liquid dispenser may create a flow of liquid in the filling hose. Additionally, there may be provided a second liquid reservoir containing a concentrate. The concentrate contained in the second liquid reservoir may be drawn into the flow of liquid within the filling hose and also transferred to the liquid dispenser. Turbulent movement of the liquid within the filling hose may cause the concentrate to mix with the liquid, diluting the concentrate. Mixing of the concentrate with the liquid passing through the filling hose is therefore automatic, and advantageously does not require additional complex (e.g. mechanical) mixing apparatus. In addition, there may be provided a valve arrangement configured to control the extent of dilution of the concentrate with the liquid within the filling hose. This allows an operator to refill a liquid dispenser with soap solution of a desired concentration. Advantageously, it can be ensured that said concentration is not too high, which could result in wastage of concentrate and increased costs. It can also be ensured that said concentration is not too low, which could result in a soap solution being dispensed from the liquid dispenser that is ineffective in killing pathogens.

The second liquid reservoir may be configured to be removably attached to the filling hose. This advantageously means that the second reservoir can be detached from the filling hose upon the volume of concentrate contained therein becoming depleted, and as such, easily replaced with another reservoir.

A purged filling hose is a filling hose that has had air and/or old liquid expunged. By providing a purged filling hose and employing it to fill an airless liquid container forming part of a liquid dispenser, contamination arising from interaction in the filling hose between the filling liquid and air and/or old liquid is prevented. In a similar vein, employing and filling an airless liquid container in the liquid dispenser prevents contamination arising from interaction between filling liquid and air in the liquid dispenser.

The filling hose employed in the method may be any previously described filling hose configuration.

The filling hose and/or airless container may be collapsible. Providing a collapsible filling hose greatly simplifies removing air or old liquid from the filling hose in that in the fully collapsed state, no air or old liquid can remain. This is equally true of the container of the liquid dispenser; by being able to collapse, the dispensed liquid need not be replaced with air, for example.

The method may further comprise employing a proximal valve in the vicinity of the proximal end of the filling hose. This facilitates avoiding fluid flowing in a proximal direction, potentially contaminating the liquid supply.

The proximal valve may be formed by virtue of the coupling between the filling hose and the fluid reservoir or liquid supply station. This helps mitigate against third parties providing substandard parts by creating an interdependence between the filling hose and fluid reservoir.

The proximal valve may be formed in the liquid reservoir or liquid supply station. The method may further comprise a distal valve in the vicinity of the distal end of the filling hose. The distal valve is formed by virtue of the coupling between the filling hose and the liquid dispenser. Again, this helps prevent third parties providing substandard replacement parts by creating an interdependence between the filling hose and liquid dispenser. The distal valve may be formed in the filling hose. The distal valve may be formed in the fluid dispenser. The latter options offer a simplicity of manufacture.

The proximal and/or distal valves may be one-way valves permitting fluid to flow in a distal direction only. This prevents contamination arising from proximal flow of fluid into either the fluid reservoir or from the liquid dispenser into the filling hose.

The proximal and/or distal valves may be reversibly operable to block fluid flow in both distal and proximal directions. This can facilitate purging of the fluid hose from air or old liquid. For example, the proximal valve could be set to proximal flow only and the distal valve to block proximal and distal flow, with contents of the filling hose then being sucked through the proximal valve and out of the filling hose.

The coupling between the reservoir and the filling hose may be of a rotate-and-click form. The coupling between the filling hose and the fluid dispenser may be of a rotate-and-click form. Either provide audible feedback to the operator ensuring that a good fit has been achieved, mitigating against contamination arising from an improper coupling.

There may be provided a controller for controlling filling operations. This facilitates automated delivery of the fluid from the reservoir, through the filling hose, to the dispenser and control over this process.

The controller may be arranged to provide transfer input means to allow an operator to activate transfer of the fluid. The controller may be arranged to provide purging input means to allow an operator to manually activate purging of air from the filling hose. This facilitates manual activation of transfer or purging, the transfer or purging being controlled by the controller.

The controller may be arranged to automatically activate purging prior to transfer of the fluid upon initialization of the transfer input means. This mitigates against contamination that would otherwise arise owing to purging not otherwise having taken place.

The controller may be arranged to interact with a supply-level detector provided in the liquid reservoir or liquid supply station for indicating how full the liquid reservoir is. The controller could be arranged to prevent fluid transfer when the supply-level detected by the supply-level detector is below a pre-determined threshold. The controller could conveniently be arranged to receive a dispenser-capacity signal from the liquid dispenser whereupon it could compare the dispenser-capacity with the supply-level detected by the supply-level detector thereby to ensure that sufficient liquid exists in the liquid source to fill the liquid container in the liquid dispenser. This would provide numerous advantages such as facilitating prevention of transfer of fluid when the supply quantity is too low. The user could be alerted via an audible or visual warning that the liquid source needs to be replenished.

The controller may be arranged to provide a fill-level detector for indicating how full the liquid dispenser is. This enables a progress indication of filling of the liquid dispenser and facilitates prevention of overfilling.

The controller may control the pump thereby to adjust the flow rate of the liquid to the liquid dispenser according to an output from the fill-level detector. Thus overfilling or straining the liquid container of the liquid dispenser is prevented whilst increasing the speed of filling.

The fill-level detector may comprise a pressure sensor. This offers a simplistic mechanism for monitoring the fill-level of the liquid dispenser.

The controller may be arranged to cease transfer when the fill-level detector detects that the fluid dispenser is at full capacity. This prevents overfilling.

The controller may be provided as part of the filling hose. The controller may be detachably connectable to the filling hose. This facilitates replacement of the filling hose. This is synergistic with providing collapsible filling hoses as easy replacement of cheap once or several-use hoses is facilitated.

The controller may be provided as part of the reservoir. This facilitates cheaper replacement of the filling hose. There is a synergy between this and providing collapsible filling hoses; the filling hoses can be provided in multipacks and replaced on a per-use basis.

The controller may be provided as part of the fluid dispenser. In this way the controlling can be made specific to the fluid dispenser being filled. A fill-level detector can be easily implemented in this arrangement.

The controller may comprise an electronic display. The electronic display may provide indicators such as purging status, number of uses of the filling hose, and/or quantity of liquid in the liquid reservoir or liquid dispenser remaining. This offers the potential for visual feedback to the user concerning the filling operation. A warning message could be displayed to the user when purging has yet to occur.

The liquid dispenser may be a soap dispenser and the liquid may be a soap. Soap is sensitive to contamination and anti-contamination measures are therefore of particular benefit in the case where the liquid is a soap solution.

The liquid dispenser may be a soap dispenser, the liquid may be water and the concentrate may be soap concentrate. Soap is sensitive to contamination and anti-contamination measures are therefore of particular benefit in the case where the liquid is a soap solution.

There is also disclosed a system for filling a liquid dispenser, comprising: any one of the previously described liquid filling hoses; and a liquid reservoir and/or liquid supply station. The liquid filling hose and liquid supply can thus be tailored for one another. Janitors or other service providers can conveniently transport the system from one liquid dispenser to the next. A benefit of the system is that the liquid dispensers can be "topped up" at any time, it is not necessary for the dispenser to be empty before replacement and so the likelihood of an interruption in the supply of liquid is dramatically reduced. The potential to top up a part full dispenser also allows for improved scheduling of the dispenser servicing, often reducing the number of visits needed to maintain a constant supply.

The liquid filling hose may be integrally connected to the liquid reservoir or to the liquid supply station.

DETAILED DESCRIPTION

Figure 1:
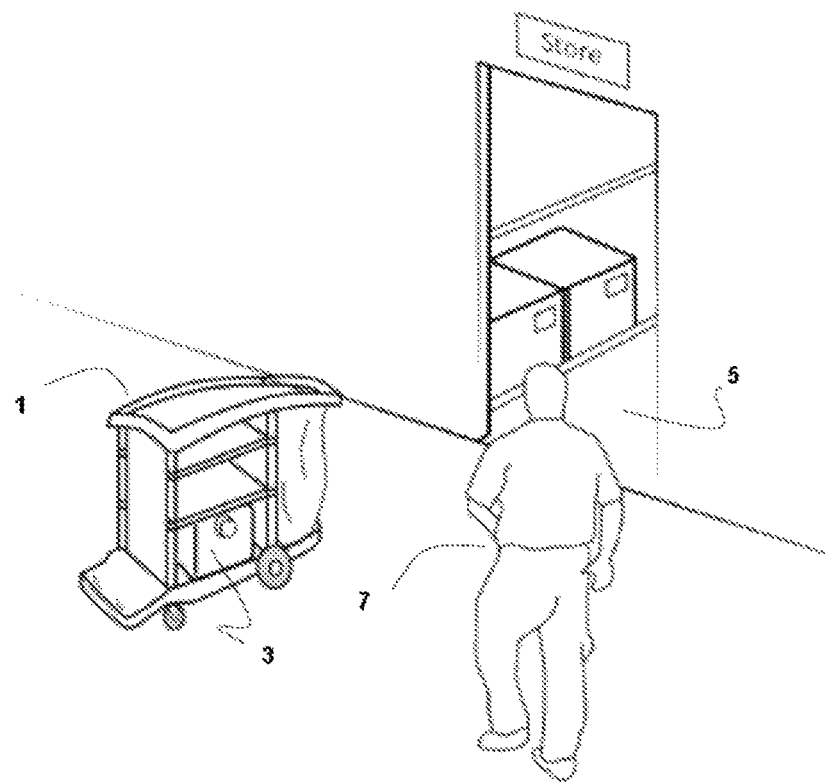
FIG. 1 shows a service trolley being prepared for use by a janitor or other service provider.

FIG. 1 shows a mobile cleaning trolley 1 for use by a janitor 7. The janitor 7 can prepare the cleaning trolley 1 inside or outside a cleaning cupboard or cleaning store room 5 from which cleaning supplies may be taken to prepare the cleaning trolley 1 ready for a cleaning round. In a cleaning round, the janitor may trundle the cleaning trolley 1 around a building, perform cleaning, empty rubbish bins and the like. In a building with liquid dispensers 9, the janitor 7 will refill the liquid dispensers 9 using soap contained within a liquid reservoir 3.

Figure 2:
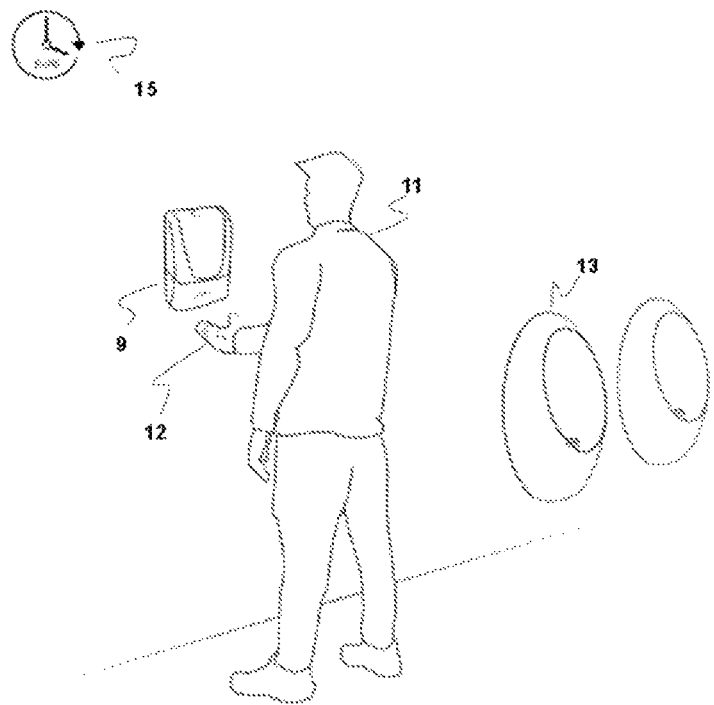
FIG. 2 shows a liquid dispenser in a toilet and an operator of the same.

FIG. 2 shows a toilet room providing urinals 13 in which a gentleman 11 is seen operating a liquid dispenser 9. Communal toilets notoriously harbour bacteria partly owing to frequent use by multiple persons all of whom can generate or otherwise introduce sources of bacteria through various mechanisms. The spread of bacteria can lead to infection causing illness and even death, particularly in environments such as the hospital, where exposure to infectious bacteria can be lethal. Bacteria is often carried and spread by human hands and it is for this reason that signs encouraging thorough hand washing can be seen in schools and hospitals.

To facilitate hand cleaning and to combat the spread of bacteria by human hands, liquid dispensers 9 that contain and dispense anti-bacterial soap or alcohol based hand sanitisers are provided throughout buildings in key locations such as toilets as shown in FIG. 2, prior to entry to school dining halls, hospital wards and operating theatres, etc. The liquid dispenser 9 shown in FIG. 2 is of the automatic variety, and the user 11 need only place his hand 12 underneath the liquid dispenser 9 for activation thereof, whereupon liquid soap is dispensed onto the hand of the user 11. The liquid dispenser 9 can employ light or motion detectors for such automatic activation. In any case, the automated dispensing mechanism promotes contact-free use. Contact-free use removes the potential for bacteria to be spread from one user to another via a manual activator of the liquid dispenser.

Although in FIG. 2 a soap liquid dispenser is shown, other forms of liquid dispenser that can be employed in connection with the present disclosure include dispensers for dispensing e.g. shampoo and/or conditioner, body lotion, alcohol base hand sanitiser, face wash or hair gel.

Regardless of the form of liquid dispenser, but particularly so for a liquid soap dispenser 9, a liquid dispenser can be compromised by bacteria. The dispenser can become a source and propagator of bacteria, which can end up being spread to every dispenser operator. The dispenser role can effectively be reversed from one of fighting the spread of bacterial infection to one of promoting the spread of bacterial infection.

Control of contamination of the liquid dispenser is therefore of paramount importance and it is desirable to combat sources of contamination.

One such source of contamination arises from the refill process 15, necessitated by virtue of the liquid dispenser 9 holding a finite volume of liquid, which must be periodically replaced by a janitor 7 or other service provider.

Disclosed herein is a device and a method for filling a liquid dispenser 9 that mitigates contamination arising from the refill process. To help aid understanding, an exemplary method of filling a liquid dispenser shall now be described with reference to FIGS. 3 to 6, interspersed with certain apparatus specifics and variants. Basic apparatus specifics implementable using common and readily known mechanical techniques have been omitted.

Figure 4:
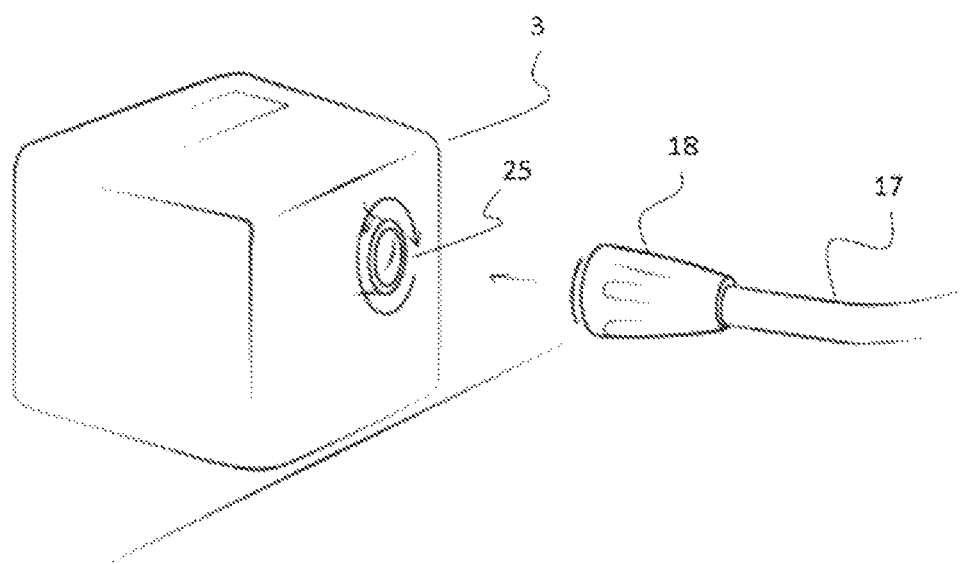
FIG. 4 shows a coupling mechanism between the liquid reservoir and liquid filling hose.

Turning to FIG. 4, a liquid reservoir 3 is provided which constitutes a liquid supply. The liquid reservoir 3 provides the supply of liquid that is employed to fill the liquid dispenser. Filling can comprise an initial filling of an empty liquid dispenser 9 or refilling of a partially full liquid dispenser 9. The liquid reservoir 3 shown in FIG. 4 is provided on a trolley 1 facilitating transport of the liquid reservoir 3. Equally it could be wall mounted.

Figure 3:
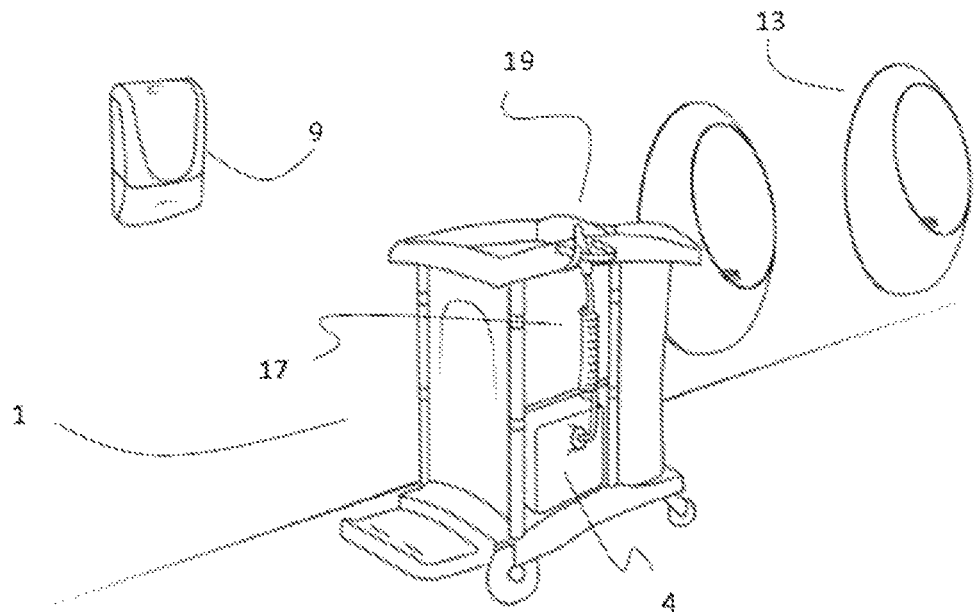
FIG. 3 shows a service trolley incorporating a liquid dispenser system ready for use and proximate a liquid dispenser in a toilet.

As an alternative to a liquid reservoir 3, a liquid supply station 4 can be provided as shown in FIG. 3. The liquid supply station 4 shown in FIG. 3 is provided on a trolley 1, but could also be wall-mounted. The liquid supply station 4 comprises a liquid reservoir and a pump for transferring liquid. The liquid reservoir may be mateable with the liquid supply station 4. For example, the liquid reservoir of the liquid supply station 4 may be in the form of a cartridge that is mated with the liquid supply station 4 and can be replaced when required. Alternatively, the liquid reservoir of the liquid supply station 4 may itself be refilled from another liquid reservoir such as from a bulkier, less transportable, but larger master liquid reservoir provided in the store room 5. In such a case it would be helpful for the liquid reservoir of the liquid supply station to be collapsible, facilitating airless refill. The liquid supply station 4 is then arranged to provide a flow channel between the fluid reservoir of the supply station 4 and the filling hose 17 when the filling hose 17 is coupled with the liquid supply station 4.

The liquid supply station 4 may comprise an electrically controllable diverter that is arranged to switch between two flow paths, one flow path fluidly connecting the filling hose 17 with the liquid reservoir, and another flow path fluidly connecting the filling hose with a waste channel. An inline pump may be provided between the diverter and the filling hose that can be operated in a forward and in a reverse direction. A controller can then be arranged to electrically communicate with the pump and the diverter such that when it is desired to purge the filling hose 17, and optionally also the liquid container 21 of the liquid dispenser 9, the pump is operated in a reverse mode causing fluid to flow in a proximal direction and the diverter is switched to the flow path fluidly connecting the filling hose with the waste channel. Old fluid or air is then sucked through the fluid hose and into the waste flow channel of the liquid supply station 4. When it is desired to transfer fluid, the controller can operate on the diverter to switch it to the flow path fluidly connecting the filling hose 17 and the liquid reservoir 3 and the controller can operate the pump in forward mode to cause fluid to flow in a distal direction from the liquid reservoir 3 into the filling hose 17.

Next a purged filling hose 17 is provided and is coupled at a proximal end thereof to the liquid reservoir 3, as shown in FIG. 4. A purged filling hose is a filling hose that has had air or old liquid expunged. The filling hose 17 may be purged using different means.

For example, a pump may be operated to transfer liquid from the liquid reservoir 3 into the liquid filling hose 17 thereby to force any old liquid and/or air from the liquid filling hose 17 out of the liquid filling hose 17. The pump could be provided in addition to the liquid reservoir, as part of a liquid supply station, or as part of the filling hose. This pump would then be the same pump that is used to transfer fluid from the liquid reservoir 3 to the fluid dispenser 9.

Alternatively a pump may be employed to suck air and/or old liquid from the filling hose 17 out of a proximally disposed suction port, not shown. The suction port may have a suction port valve switchable between a state in which fluid can flow in a direction out of the suction port and a state in which fluid flow in both directions is blocked. Distal and proximal valves could be employed in order to block flow in proximal and distal directions and thereby facilitate the creation of a vacuum in the filling hose 17 using the pump to suck air and/or old liquid therefrom. A suction port valve may be closed and the proximal valve could then be opened to fill the vacuum in the filling hose 17 with new, fresh liquid from the liquid reservoir 3.

Where a liquid supply station 4 is employed, the pump of the liquid supply station 4 could be placed in reverse mode, and old liquid and/or air diverted into a waste container. The waste container could be provided as part of the liquid supply station 4 or the liquid supply station 4 could have a waste exit and the liquid could be delivered to an external waste container. A switchable diverter could be employed to provide two different flow paths. One path between the filling hose and liquid reservoir and another path between the filling hose and the waste container or waste exit.

The proximal end 18 of the filling hose 17 is then coupled to the reservoir so as to provide a fluid connection between the liquid reservoir 3 and the filling hose 17, see coupling in FIG. 4 and coupled state in FIG. 3. As shown in FIG. 4, the coupling between the filling hose 17 and liquid reservoir 3 may be of a rotate-and-click form, providing audible feedback to the operator 7 to indicate completion of the couple; the proximal end of the filling hose 17 is inserted over an aperture 25 and subsequently rotated such that the proximal end of the filling hose 17 locks to the liquid reservoir 3. Such an interlocking mechanism may be implemented using conventional mechanical interlocking mechanisms known in the art.

Figure 5:
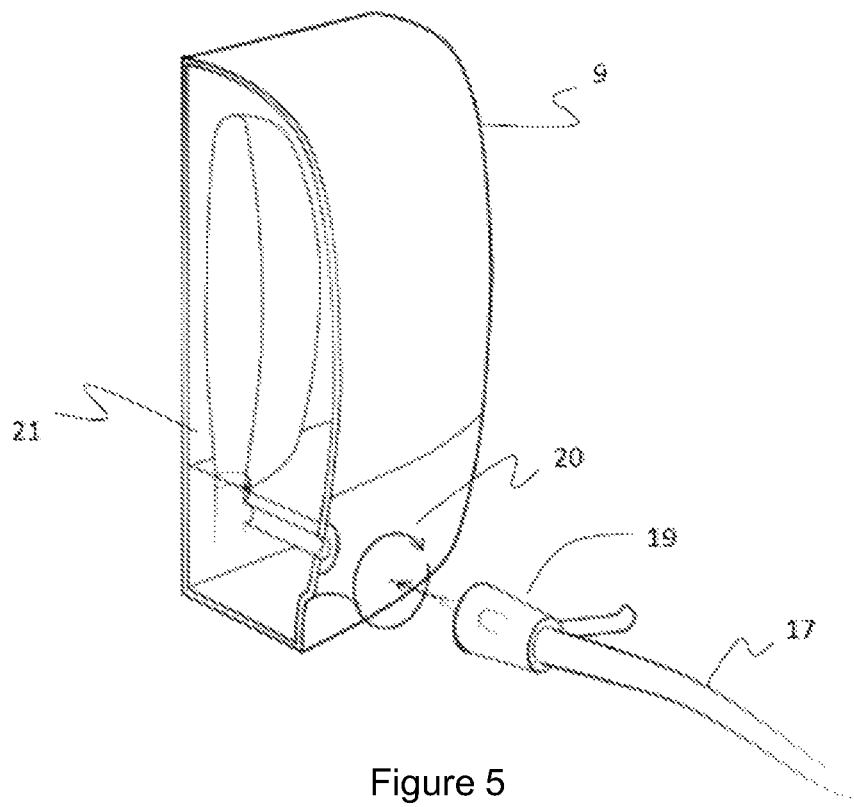
FIG. 5 shows a coupling mechanism between the liquid filling hose and liquid dispenser.
Figure 6:
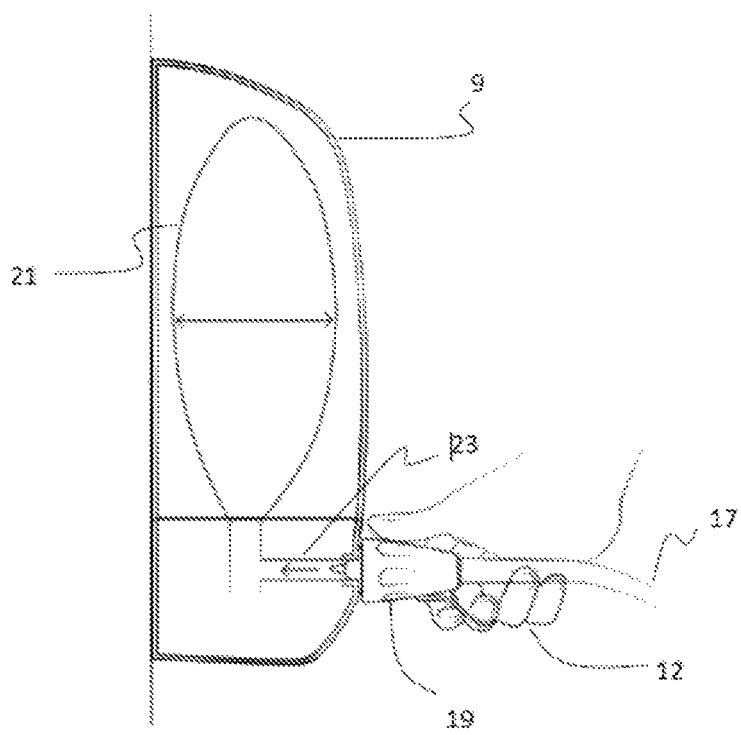
FIG. 6 shows a cross sectional slice of the liquid dispenser showing the liquid container of the liquid dispenser and flow of fluid from the filling hose thereto.

As shown in FIG. 5, the distal end 19 of the filling hose 17 is then coupled to an aperture 20 of the liquid dispenser 9 so as to form a fluid connection between the filling hose 17 and the liquid dispenser 9. Again, the coupling mechanism may be of the rotate-and-click form adopted for the coupling between the filling hose 17 and the liquid dispenser 3.

It will be observed from FIG. 5 that the liquid container of the liquid dispenser 9 is in a partially-filled state, i.e. is neither full nor empty. By contrast, in FIG. 6 the liquid container 21 is shown in the full-state. In both cases, the liquid container 21 is airless; there is no air inside the liquid container 21, which air could otherwise contaminate liquid contained within the liquid container 21. In the exemplary example shown in FIGS. 5 and 6, this is achieved using a collapsible container. The collapsible container defines a volume that reduces as liquid is dispensed, preventing any reduction in pressure and the need for dispensed liquid to be replaced by air.

Finally, the liquid in the liquid reservoir 3 or liquid reservoir of the liquid supply station 4 is transferred via the filling hose 17 through a channel 23 in the liquid dispenser 9 to the airless liquid container of the liquid dispenser 9. As the filling hose 17 has been purged and because the liquid container of the liquid dispenser 9 is airless, the filling liquid does not encounter air and/or old liquid in the filling hose and contamination is therefore prevented.

Figure 7:
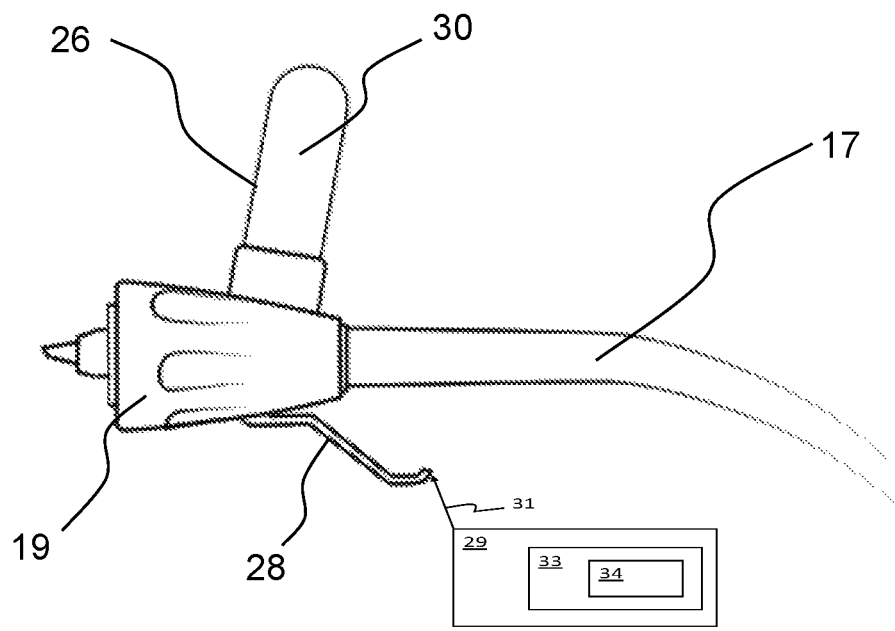
FIG. 7 shows the liquid filling hose with a second liquid reservoir in a removably attached position.

With reference to FIG. 7, the liquid dispenser filling hose 17 may additionally comprise a second liquid reservoir. In this embodiment, the second liquid reservoir is in the form of a cartridge 26 that is removably attached to the filling hose 17, and is configured to contain a predetermined volume of concentrate. Said concentrate may be soap.

Referring again to FIG. 7, the cartridge 26 is shown as being removably attached to the filling hose 17. Upon connection of the filling hose 17 to the liquid dispenser (not shown), liquid may be automatically transferred from the liquid reservoir via the filling hose 17 to the liquid dispenser, creating a flow of liquid in the filling hose 17. Upon actuation, the cartridge 26 is in fluid communication with the filling hose 17, thus allowing a flow of concentrate from the cartridge 26 into the filling hose 17, whereupon the concentrate is mixed by, and incorporated into, the turbulent flow of liquid within the filling hose 17. As such, the diluted concentrate is also transferred to the liquid dispenser. Alternatively, transfer of liquid between the liquid reservoir and the liquid dispenser may be controlled through the use of a controller 28, in this case a manually actuated control lever 28. When in an engaged position, said control lever 28 may additionally, or alternatively act to lock the cartridge 26 in a removably secured position.

Movement of the concentrate between the cartridge 26 and the filling hose 17 may be regulated by a Venturi effect, arising within the filling hose 17. Alternatively, the cartridge 26 may have a deformable body portion 30, wherein said body portion 30 can be deformed e.g. by compression.

Under the action of such deformation, the concentrate contained therein may be forced to flow out of the cartridge 26.

Figure 8:
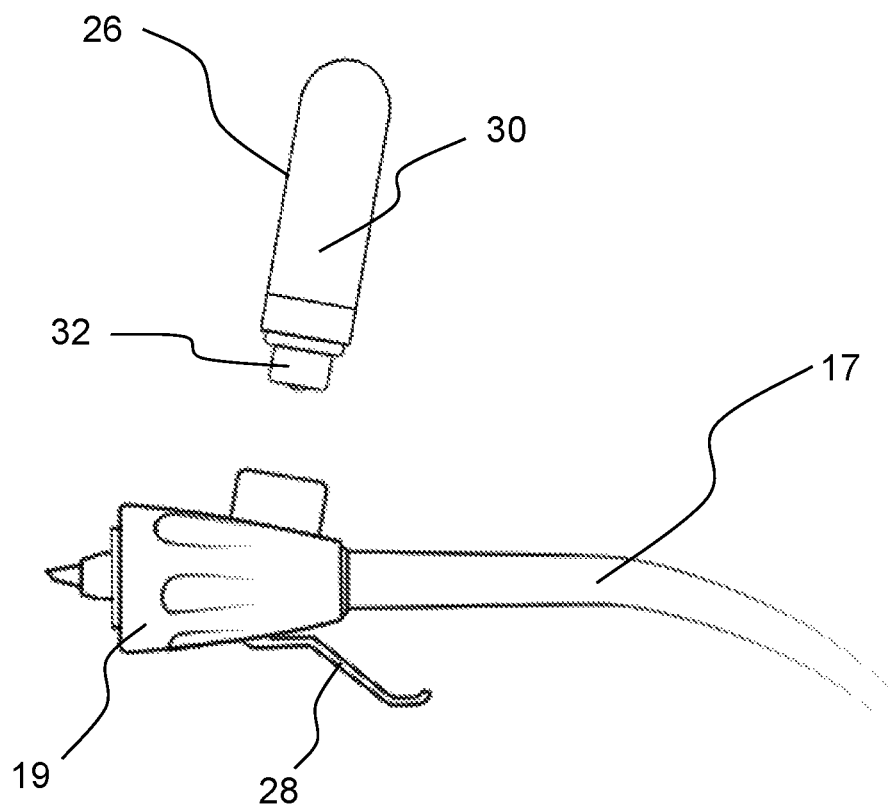
FIG. 8 shows the liquid filling hose with the second liquid reservoir in a detached position.

Referring to FIG. 8, release of the concentrate from the cartridge 26 is controlled by a valve arrangement, indicated generally at 32. Said valve arrangement prevents the release of concentrate from the cartridge 26 when said cartridge is not releasably attached to the filling hose 17. Further, the valve arrangement 32 may also retain the liquid in the cartridge until the liquid is being transferred between the liquid reservoir and the liquid dispenser. The valve arrangement 32 may comprise a one-way valve, and only allow unidirectional movement of concentrate. In such circumstances, concentrate movement would only be allowed in a direction exiting the cartridge 26. Alternatively, the valve arrangement 32 may comprise a two-way valve, and also allow the movement of concentrate in a direction entering the cartridge 26. This may be advantageous should it be desirable to re-fill the cartridge 26 when the level of concentrate is depleted, for instance to provide for recycling of the cartridge.

Referring to both FIGS. 7 and 8, the cartridge is provided at the distal end 19 of the filling hose 17, and may be provided as part of a distal coupler. Alternatively, the second liquid reservoir may be provided as part of a proximal coupler, or removably attached between the distal end and the proximal end of the filling hose 17 at any point configured to allow the removable attachment of a second liquid reservoir. The second liquid reservoir may be also be removably attached to the liquid reservoir or the liquid reservoir of the liquid supply station (not shown).

The cartridge 26 is removably attached by virtue of a rotate-and-click coupling. This ensures that the cartridge 26 can be quickly and easily detached from the filling hose 17, and another cartridge engaged in its place with the minimum of inconvenience. This advantageously ensures that a depleted cartridge may be easily replaced upon the volume of concentrate contained therein reaching a predetermined minimum level. Alternatively, the cartridge 26 may be removably attached by virtue of a retaining pin, a threaded, bayonet or other interference fitting, or by any other means suitable for securing the cartridge 26 in place.

The body portion 30 of the cartridge 26 may be manufactured from a transparent or a translucent material. This would allow a user to observe when the volume of concentrate contained therein had reached a predetermined minimum level, and as such, replace said cartridge.

Contamination can be still further be prevented by purging not only the filling hose 17 prior to filling the dispenser 9, but also purging the liquid container of the liquid dispenser 9. Although optional, this additional purging could be performed after a certain number of refills to remove any trace accumulation of aging liquid that is not dispensed prior to refill.

The liquid container in the liquid dispenser 9 and the liquid filling hose 17 could be simultaneously purged by connecting the filling hose 17 to the liquid dispenser 9 prior to initialization of one of the purging operations described above. For example, a pump could suck liquid from the liquid container of the liquid dispenser 9 and air and/or liquid from the filling hose 17 out of the suction port of the filling hose 17 in one operation whilst the filling hose is connected to the liquid dispenser 9. Alternatively, the pump from the liquid supply station 4 could suck the liquid from the liquid container of the liquid dispenser 9 and air and/or liquid from the filling hose 17 proximally out of the liquid filling hose 17 and direct it to the waste container forming part of the liquid supply station 4 or out of a waste exit of the liquid supply station 4. In this arrangement there could be employed a collapsible liquid container in the liquid dispenser 9 and/or a collapsible filling hose. Combining purging of the liquid container of the liquid dispenser 9 with purging of the filling hose 17 would provide the advantage of reducing the number of operations, potentially speeding up refilling where purging of the liquid dispenser prior to filling is deemed necessary. Furthermore, in the case where the filling hose is provided with a controller, the controller could automatically purge and subsequently transfer liquid upon connection of the liquid supply station 4, liquid filling hose 17 and liquid dispenser 9. This offers enhanced simplicity.

The liquid filling hose 17 may be provided with a controller for controlling a pump. Alternatively the liquid supply station 4 or liquid reservoir 3 could be provided with the controller. In an exemplary arrangement the controller is electronic and electrically communicates with other components including the pump using electrical signals. Employing an electronic controller provides numerous benefits such as being able to monitor filling operations and ensure that liquid is not transferred from the liquid reservoir 3 or liquid supply station 4 to the liquid dispenser 9 prior to purging. The controller could be arranged to keep a record of the number of times a liquid dispenser 9 has been refilled, optionally being arranged to purge the liquid dispenser 9 in the case where the number of refill operations for the liquid dispenser 9 has exceeded a pre-determined value.

The filling hose 17 may comprise a fill-level module. The fill-level module may be part of the controller. In an exemplary arrangement this is electronic and electrically communicates with the electronic controller. The fill-level module sends a fill-level signal to the controller indicative of the fill-level of the liquid dispenser. The fill-level module may itself determine the fill-level by employing a pressure sensor which monitors the pressure of the fluid in the filling hose, an increase of pressure being indicative of the liquid container 21 of the liquid dispenser 9 reaching, or having reached, full capacity. The controller may at this point be configured to stop the transfer of liquid by appropriately communicating with the pump.

Alternatively the fill-level module may receive and pass on to the controller a fill-level signal generated by the liquid dispenser 9. In this case the liquid dispenser 9 and the controller would be required to electrically communicate with one another via the coupling between the filling hose 17 and the liquid dispenser 9. This could take many forms such as electrical contacts that adjoin upon the couple between the filling hose 17 and liquid dispenser 9 having been formed.

The controller may be permanently attached to the filling hose, detachably connectable to the filling hose, or even entirely separate from the filling hose. The controller may be provided as part of the liquid supply station 4.

Preferably the controller employs electrical communication in order to control the pump, diverter if present, supply-level detector in the liquid reservoir 3 if present, fill-level detector in the liquid dispenser 9 if present.

The electrical communication may be achieved via the use of control lines running along the length of the filling hose and employing electrical interfaces in the proximal or distal coupling mechanisms that electrically connect with corresponding electrical interfaces in electrical communication with the proximal or distal components to which the controller is electrically connected. The interface may be employed using mating electrical contact points, mating sleeves, and the like.

In the case where the controller is detachable connectable to the filling hoses, there would be required to be an electrical interface between the controller and the filling hose that electrically couples the controller and the control lines in the filling hose upon connection between the controller and the filling hose.

The controller may be battery powered. It may be dockable in a recharging dock for recharging the battery.

Typically, the filling hose 17 will be formed from a material such as polyvinyl chloride (PVC), latex rubber, nitrile rubber, ethylene propylene diene terpolymer rubber (EPDM rubber), Nylon™, polyurethane, polyethylene (low, medium or high density), PTFE, Santoprene™ or combinations thereof. The liquid dispenser 9 will often comprise polycarbonate/polyethylene terephthalate (PET), polycarbonate/polybutylene terephthalate (PBT), PET, polypropylene, acrylonitrile butadiene styrene, or combinations thereof. The liquid container 21, liquid reservoir 3 and second liquid reservoir will often be formed from polyethylene (linear-low density or low density), Nylon™, PVC, PET, polypropylene or combinations thereof and any couplings (not shown in figures) may be formed from polyoxymethylene, Nylon™, polycarbonate/PET, polycarbonate/PBT or combinations thereof.

The controller could be employed to monitor the quantities of soap in the liquid dispensers 9 distributed throughout the building or the quantity of fluid left in the liquid reservoir 3. This could prompt re-purchase of stock, in the case where the liquid reservoir 3 is running low.

To achieve this the controller could be provided with a visual display providing a visual indication of the supply-level of the liquid reservoir 3 and/or the fill-level of the liquid dispenser 9. The visual display could also provide a visual indication of whether the filling hose has been purged.

The invention claimed is:

1. A hand-liquid dispenser filling hose for use in filling a hand-liquid dispenser with a hand-liquid comprising liquid from a first liquid reservoir, wherein the liquid is pumped through the filling hose via a pump, the filling hose comprising:
   a distal coupler for coupling the filling hose to the hand-liquid dispenser;
   a controller arranged to control the pump;
   a distal coupling detector that provides a signal to the controller upon coupling between the filling hose and the hand-liquid dispenser, wherein the controller is arranged to automatically initiate liquid transfer upon coupling of the filling hose with the hand-liquid dispenser; and
   a fill-level module in communication with the controller and arranged to send a fill-level signal to the controller, the fill-level module comprising a fill-level detector comprising a pressure sensor arranged to detect a change in pressure in the fluid that is being transferred to the hand-liquid dispenser;
   the hand-liquid dispenser filling hose further comprising a second liquid reservoir which is removably attached to the filling hose; and
   wherein the hand-liquid is selected from the group consisting of soap, shampoo and/or conditioner, body lotion, alcohol based hand sanitiser, face wash and hair gel.

2. The hand-liquid dispenser filling hose of claim 1, wherein the second liquid reservoir is configured to contain a concentrate.

3. The hand-liquid dispenser filling hose of claim 1, wherein upon activation of the controller or upon connection of the filling hose to the hand-liquid dispenser, the liquid is activated to flow through the filling hose from the first liquid reservoir to the hand-liquid dispenser.

4. The hand-liquid dispenser filling hose of claim 1, wherein the second liquid reservoir comprises a cartridge, wherein the cartridge is configured to be detachable.

5. The hand-liquid dispenser filling hose according to claim 1, wherein:
   the pump is provided as part of a liquid supply station and the liquid reservoir is mateable with the liquid supply station; and
   a proximal coupler is arranged to couple the filling hose with the liquid supply station.

6. The hand-liquid dispenser filling hose according to claim 1, wherein: the controller is arranged to provide transfer input means to allow an operator to manually activate transfer of the fluid.

7. The hand-liquid dispenser filling hose of claim 1, wherein: the hand-liquid dispenser is a soap dispenser and the hand-liquid is soap.

8. The hand-liquid dispenser filling hose of claim 2, wherein the hand-liquid dispenser is a soap dispenser, the concentrate is soap concentrate, and the soap is formed from water and the soap concentrate.

9. A system for filling a hand-liquid dispenser, comprising:
   the filling hose according to claim 1; and
   the liquid reservoir and/or liquid supply station.

10. A hand-liquid dispenser filling hose for use in filling a hand-liquid dispenser with a hand-liquid comprising liquid from a first liquid reservoir, wherein the liquid is pumped through the filling hose via a pump, comprising:
    a distal coupler for coupling the filling hose to the hand-liquid dispenser;
    a controller arranged to control the pump; and
    a fill-level module in communication with the controller and arranged to send a fill-level signal to the controller, the fill-level module comprising a fill-level detector comprising a pressure sensor arranged to detect a change in pressure in the fluid that is being transferred to the hand-liquid dispenser;
    the filling hose further comprising a second liquid reservoir comprising a cartridge, wherein the cartridge is configured to be detachable; and
    wherein the hand-liquid is selected from the group consisting of soap, shampoo and/or conditioner, body lotion, alcohol based hand sanitiser, face wash and hair gel.

11. The hand-liquid dispenser filling hose of claim 10, wherein the second liquid reservoir is configured to contain a concentrate.

12. The hand-liquid dispenser filling hose of claim 10, wherein upon activation of the controller or upon connection of the filling hose to the hand-liquid dispenser, the liquid is activated to flow through the filling hose from the first liquid reservoir to the hand-liquid dispenser.

13. The hand-liquid dispenser filling hose of claim 10, wherein the second liquid reservoir is removably attached to the first liquid reservoir.

14. The hand-liquid dispenser filling hose according to claim 10, wherein:
    the pump is provided as part of a liquid supply station and the first liquid reservoir is mateable with the liquid supply station; and
    a proximal coupler is arranged to couple the filling hose with the liquid supply station.

15. The hand-liquid dispenser filling hose according to claim 1, wherein: the controller is arranged to provide transfer input means to allow an operator to manually activate transfer of the fluid.

16. The hand-liquid dispenser filling hose according to claim 10 wherein:
   the hand-liquid dispenser is a soap dispenser and the hand-liquid is soap.

17. The hand-liquid dispenser filling hose of claim 11, wherein the hand-liquid dispenser is a soap dispenser, the concentrate is soap concentrate, and the soap is formed from water and the soap concentrate.

18. A system for filling a hand-liquid dispenser, comprising:
   the filling hose according to claim 10; and
   the first liquid reservoir and/or liquid supply station.

\* \* \* \* \*